(12) United States Patent
Tsunoda et al.

(10) Patent No.: US 7,875,401 B2
(45) Date of Patent: Jan. 25, 2011

(54) FUEL CELL SYSTEM

(75) Inventors: Tadashi Tsunoda, Nerima-ku (JP); Hiroki Homma, Asaka (JP); Tetsuya Ogawa, Wako (JP)

(73) Assignee: Honda Motor, Ltd., Tokyo (JP)

( * ) Notice: Subject to any disclaimer, the term of this patent is extended or adjusted under 35 U.S.C. 154(b) by 1431 days.

(21) Appl. No.: 11/317,822

(22) Filed: Dec. 22, 2005

(65) Prior Publication Data

US 2006/0134476 A1 Jun. 22, 2006

(30) Foreign Application Priority Data

Dec. 22, 2004 (JP) .............................. 2004-370795

(51) Int. Cl.
*H01M 8/04* (2006.01)
(52) U.S. Cl. .................. 429/435; 429/440; 429/441
(58) Field of Classification Search ................ None
See application file for complete search history.

(56) References Cited

U.S. PATENT DOCUMENTS

| 5,789,091 | A | * | 8/1998 | Wozniczka et al. ........... 429/12 |
| 5,851,689 | A | | 12/1998 | Chen |
| 5,998,053 | A | | 12/1999 | Diethelm |
| 6,042,956 | A | | 3/2000 | Lenel |
| 7,322,405 | B2 | * | 1/2008 | Ogawa ..................... 165/158 |
| 2001/0009732 | A1 | | 7/2001 | Schuler |
| 2005/0142425 | A1 | * | 6/2005 | Homma .................... 429/38 |
| 2005/0164051 | A1 | * | 7/2005 | Venkataraman et al. ....... 429/17 |

FOREIGN PATENT DOCUMENTS

| EP | 1098381 A1 | 5/2001 |
| JP | 60-205972 | 10/1985 |
| JP | 61-58176 | 3/1986 |
| JP | 64-3971 | 1/1989 |
| JP | 04/121969 | 4/1992 |
| JP | 05/047409 | 2/1993 |
| JP | 05/251100 | 9/1993 |
| JP | 10-55815 | 2/1998 |
| JP | 10-64568 | 3/1998 |
| JP | 2001-93564 | 4/2001 |
| JP | 01/143734 | 5/2001 |
| JP | 2001-508591 | 6/2001 |
| JP | 2002-302785 | 10/2002 |
| JP | 4362359 | 8/2009 |

OTHER PUBLICATIONS

International Preliminary Report on Patentability and Written Opinion for International Application No. PCT/JP2005/024176, dated Aug. 23, 2007.
Japanese Office Action for Application No. 2004-370795, dated Nov. 17, 2009.

* cited by examiner

*Primary Examiner*—Melvin C Mayes
*Assistant Examiner*—Sheng H Davis
(74) *Attorney, Agent, or Firm*—Nelson Mullins Riley & Scarborough LLP; Anthony A. Laurentano

(57) ABSTRACT

A fuel cell system includes a fuel cell stack, a heat exchanger, a reformer, and a casing containing the fuel cell stack, the heat exchanger, and the reformer. A chamber unit is formed at an end plate of the fuel cell stack. The air heated by the heat exchanger temporarily fills the chamber unit. The heat exchanger and the reformer are directly connected to the chamber unit.

10 Claims, 17 Drawing Sheets

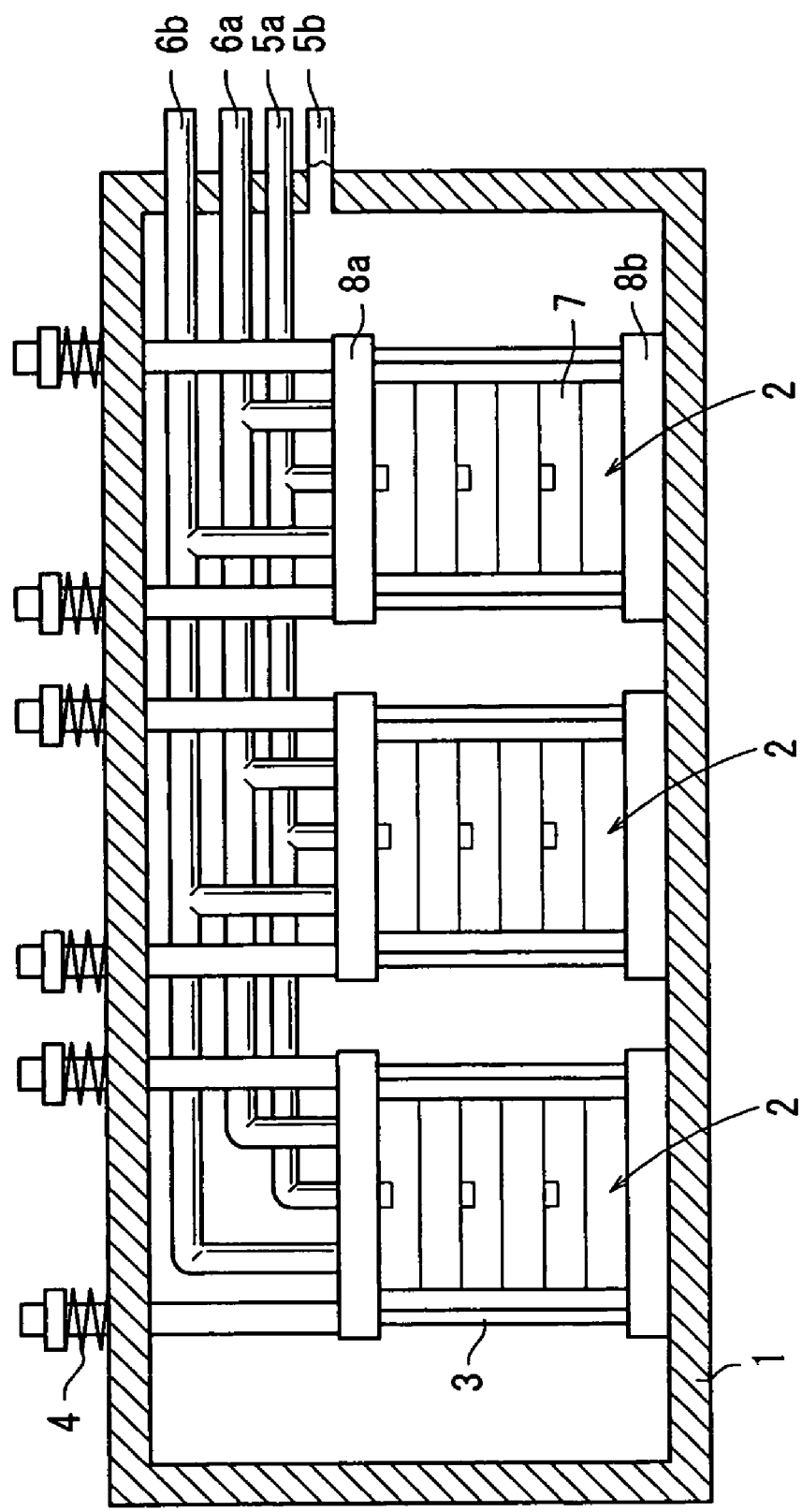

FUEL CELL SYSTEM

BACKGROUND OF THE INVENTION

1. Field of the Invention

The present invention relates to a fuel cell system including a fuel cell stack, a heat exchanger, and a reformer provided in a casing.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined number of the unit cells and the separators are stacked together to form a fuel cell stack.

In the fuel cell, an oxygen-containing gas or air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. At the anode, oxygen ions react with the hydrogen in the hydrogen-containing gas to produce water or react with CO to produce $CO_2$. Electrons released in the reaction flow through an external circuit to the cathode, creating a DC electric energy.

For example, a solid oxide fuel cell disclosed in Japanese Laid-Open Patent Publication No. 5-47409 is known. In the conventional fuel cell, as shown in FIG. 17, a plurality of cell stacks 2 are disposed in a casing 1. The cell stacks 2 are tightened together by tightening bolts 3 and belleville springs 4.

A fuel gas supply pipe 5a, an oxygen-containing gas supply pipe 6a, and an oxygen-containing gas discharge pipe 6b are connected to the cell stacks 2. The fuel gas supply pipe 5a, the oxygen-containing gas supply pipe 6a, and the oxygen-containing gas discharge pipe 6b extend though the casing 1 to the outside. A fuel gas discharge pipe 5b is attached to the casing 1. The fuel gas discharge pipe 5b is opened to the inside of the casing 1.

Each of the cell stacks 2 is formed by stacking a plurality of unit cells 7 vertically in a stacking direction. At opposite ends of the cell stack 2 in the stacking direction, end plates 8a, 8b are provided. The fuel gas supply pipe 5a, the oxygen-containing gas supply pipe 6a, and the oxygen-containing gas discharge pipe 6b are connected to the end plate 8a. The end plate 8b is placed on the bottom surface of the casing 1.

In the conventional technique, the fuel gas and the oxygen-containing gas are supplied from the fuel gas supply pipe 5a and the oxygen-containing gas supply pipe 6a into the respective cell stacks 2 through the end plates 8a. At this time, since the temperatures of the fuel gas and the oxygen-containing gas are lower than the temperature of the cell stacks 2, the temperature at positions near the reactant gas inlets of the end plates 8a decreases undesirably.

The fuel gas supply pipe 5a and the oxygen-containing gas supply pipe 6a are connected to each of the end plates 8a. Heat radiation from the end plates 8a occurs easily through the fuel gas supply pipe 5a and the oxygen-containing gas supply pipe 6a. Thus, the heat efficiency is poor. Further, in the area where the end plate 8a is connected to the fuel gas supply pipe 5a and the oxygen-containing gas supply pipe 6a, the temperature is low in comparison with the other area. Therefore, the temperature varies significantly depending on the area of the end plate 8a, and distortion may occur in the end plate 8a undesirably.

Further, dedicated space is needed for each of the fuel gas supply pipe 5a, the oxygen-containing gas supply pipe 6a, and the oxygen-containing gas discharge pipe 6b in the casing 1. Therefore, the size of the casing 1 is considerably large. The surface area of the casing 1 is large, and the heat efficiency is poor.

SUMMARY OF THE INVENTION

A main object of the present invention is to provide a fuel cell system having a compact structure in which it is possible to effectively prevent heat radiation from an end plate, while achieving uniform temperature.

According to the present invention, a fuel cell system includes a fuel cell stack, a heat exchanger, a reformer, and a casing. The fuel cell stack includes a plurality of fuel cells stacked together in a stacking direction and end plates provided at opposite ends of the fuel cells in the stacking direction. Each of the fuel cells includes an electrolyte electrode assembly and separators sandwiching the electrolyte electrode assembly. The electrolyte electrode assembly includes an anode, a cathode, and an electrolyte interposed between the anode and the cathode. The heat exchanger heats an oxygen-containing gas to be supplied to the fuel cell stack. The reformer reforms a fuel to produce a fuel gas. The casing contains the fuel cell stack, the heat exchanger, and the reformer.

A chamber unit is formed at one of the end plates, and the oxygen-containing gas heated by the heat exchanger or the exhaust gas discharged after consumption in reactions in the electrolyte electrode assembly temporarily fills the chamber unit. The heat exchanger and the reformer are directly connected to the chamber unit.

Further, it is preferable that the chamber unit has an opening for supplying the oxygen-containing gas temporarily in the chamber unit to the fuel cell stack. It is also preferable that the chamber unit has an opening which is directly opened to the chamber unit for supplying the exhaust gas temporarily in the chamber unit to the heat exchanger.

It is preferable that the heat exchanger and the reformer are provided on one side of the fuel cell stack. Further, it is preferable that the reformer is provided inside the heat exchanger, and the heat exchanger and the reformer are provided symmetrically with respect to the central axis of the fuel cell stack.

According to the present invention, the heated oxygen-containing gas or the hot exhaust gas discharged after consumption in the reactions in the electrolyte electrode assembly temporarily fills the chamber unit formed at one of the end plates. Therefore, the temperature becomes uniform in the entire end plate. No heat distortion occurs in the end plate, and heat distortion in the entire fuel cell stack is reduced effectively. Since heat radiation from the end plate is reduced, it is possible to maintain uniform operating temperature in the fuel cell stack. Further, since the oxygen-containing gas or the exhaust gas temporarily fills the chamber unit, the flow rate of the oxygen-containing gas or the exhaust gas does not change, and power generation is performed uniformly in each of the fuel cells.

Further, the chamber unit is directly connected to the heat exchanger and the reformer. Since the chamber unit is connected to the heat exchanger and the reformer without requiring any pipes, heat radiation from the pipes does not occur between the chamber unit and the heat exchanger and the reformer. Consequently, heat radiation from the pipes during power generation of the fuel cells is reduced, and it is possible to reduce heat loss suitably. Further, since no pipes are required for connecting the chamber unit to the heat exchanger and the reformer, the overall weight of the fuel cell stack is reduced, and the volume of the fuel cell stack is reduced by the elimination of the pipes. It is possible to reduce the size of the fuel cell stack.

Further, heat radiation from the fuel cells and the end plate through the chamber unit is reduced. Since no pipes are required, no heat radiation from the pipes occurs. Improvement in starting operation of the fuel cell stack is achieved.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 17 is a view schematically showing a conventional fuel cell.

DESCRIPTION OF THE PREFERRED EMBODIMENTS

Figure 1:
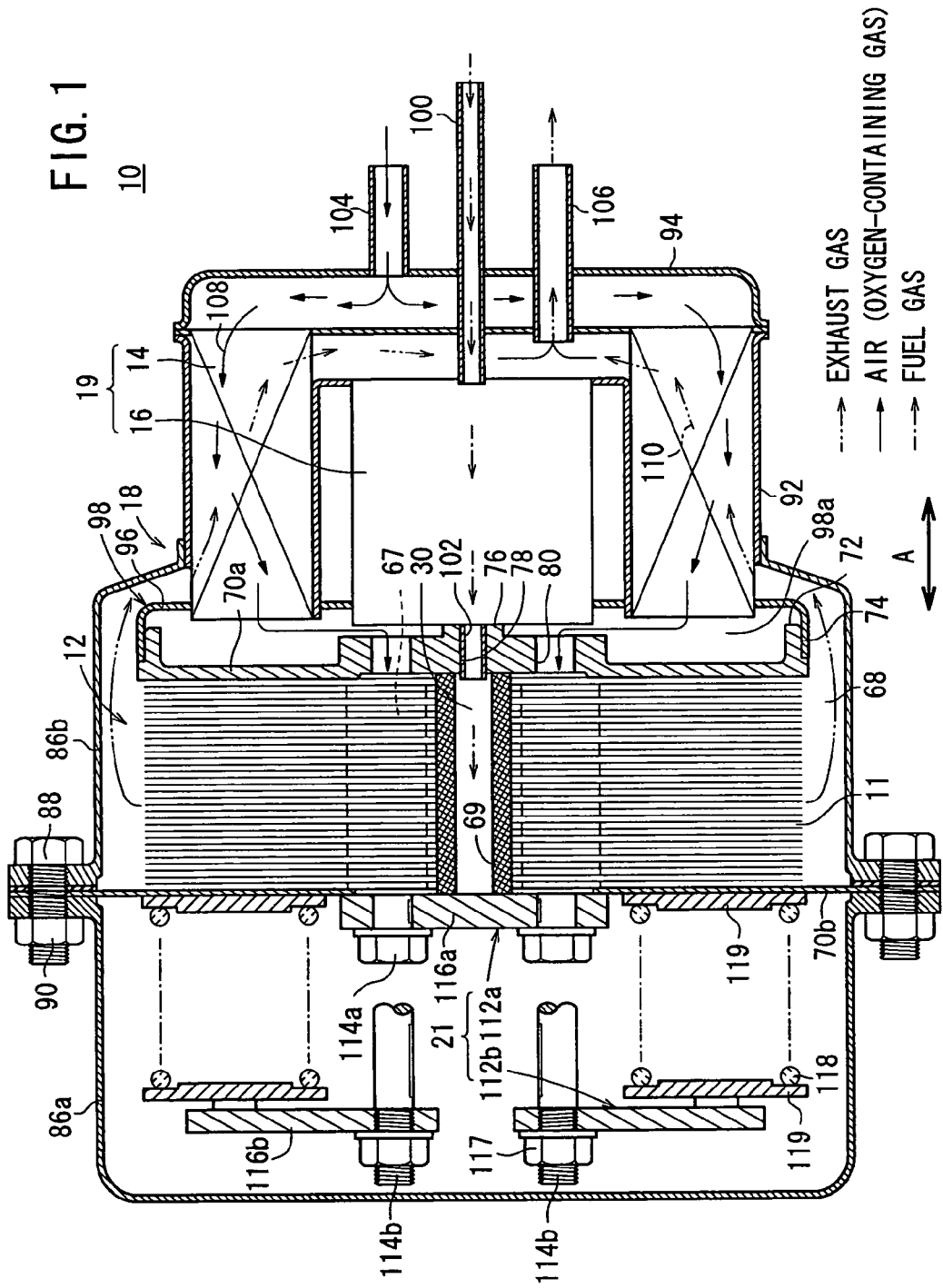
FIG. 1 is a partial cross sectional view showing a fuel cell system according to a first embodiment of the present invention.
Figure 2:
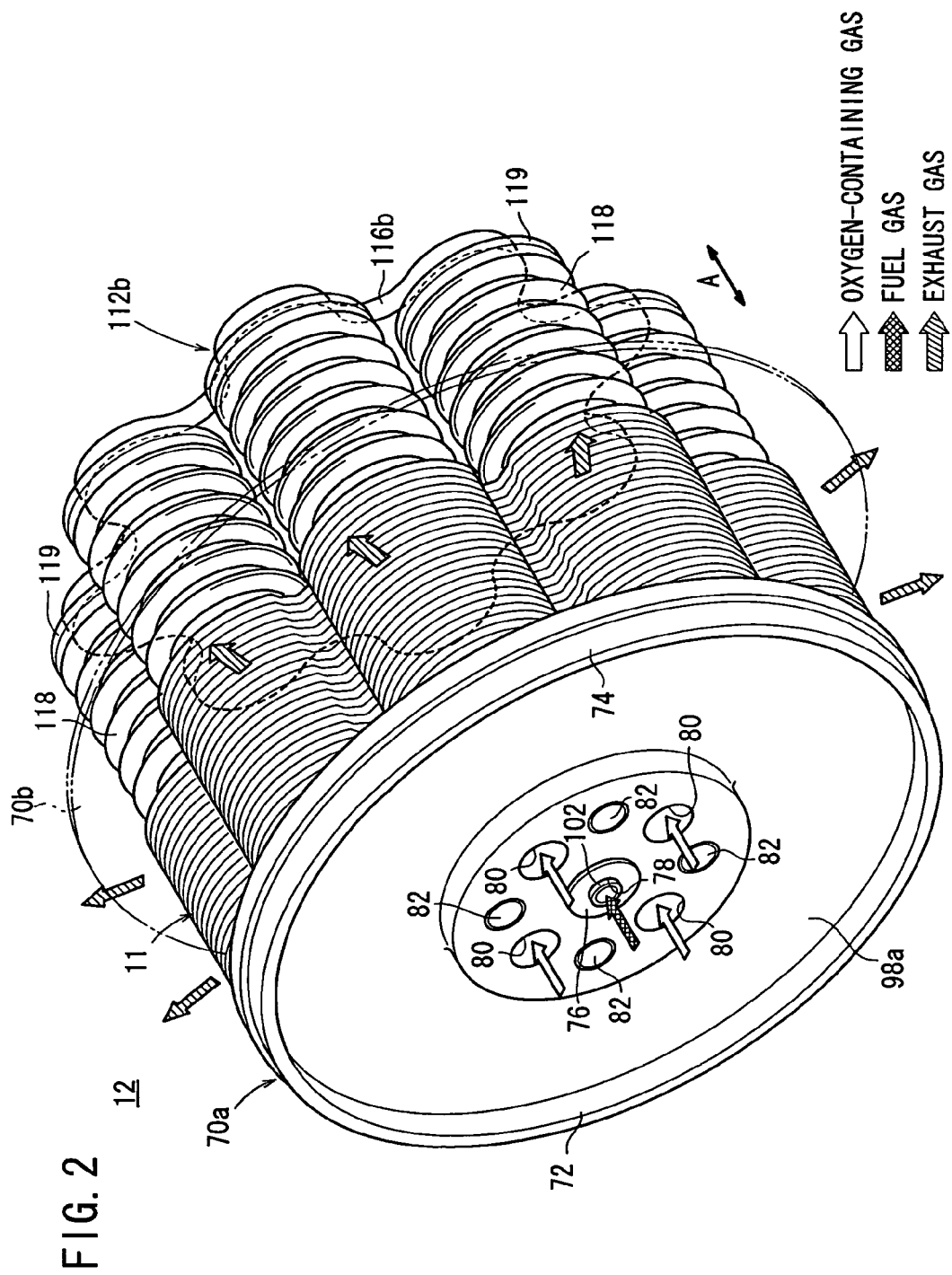
FIG. 2 is a perspective view schematically showing a fuel cell stack of the fuel cell system.

FIG. 1 is a partial cross sectional view showing a fuel cell system 10 according to a first embodiment of the present invention. FIG. 2 is a perspective view schematically showing a fuel cell stack 12 of the fuel cell system 10. The fuel cell stack 12 is formed by stacking a plurality of fuel cells 11 in a direction indicated by an arrow A.

The fuel cell system 10 is used in various applications, including stationary and mobile applications. For example, the fuel cell system 10 is mounted on a vehicle. As shown in FIG. 1, the fuel cell system 10 includes the fuel cell stack 12, a heat exchanger 14, a reformer 16, and a casing 18. The heat exchanger 14 heats the oxygen-containing gas before it is supplied to the fuel cell stack 12. The reformer 16 reforms a fuel to produce a fuel gas. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
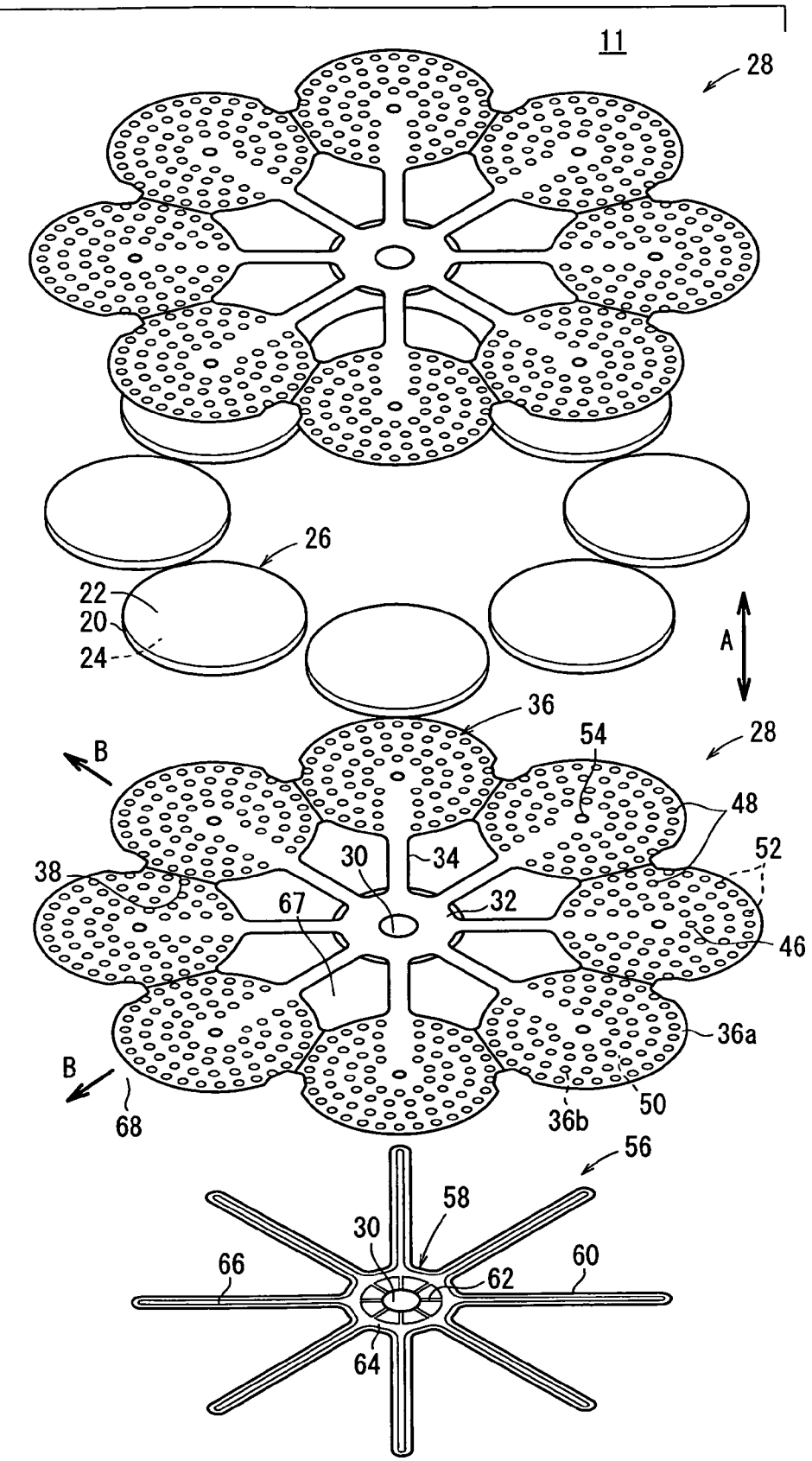
FIG. 3. is an exploded perspective view showing the fuel cell of the fuel cell stack.
Figure 4:
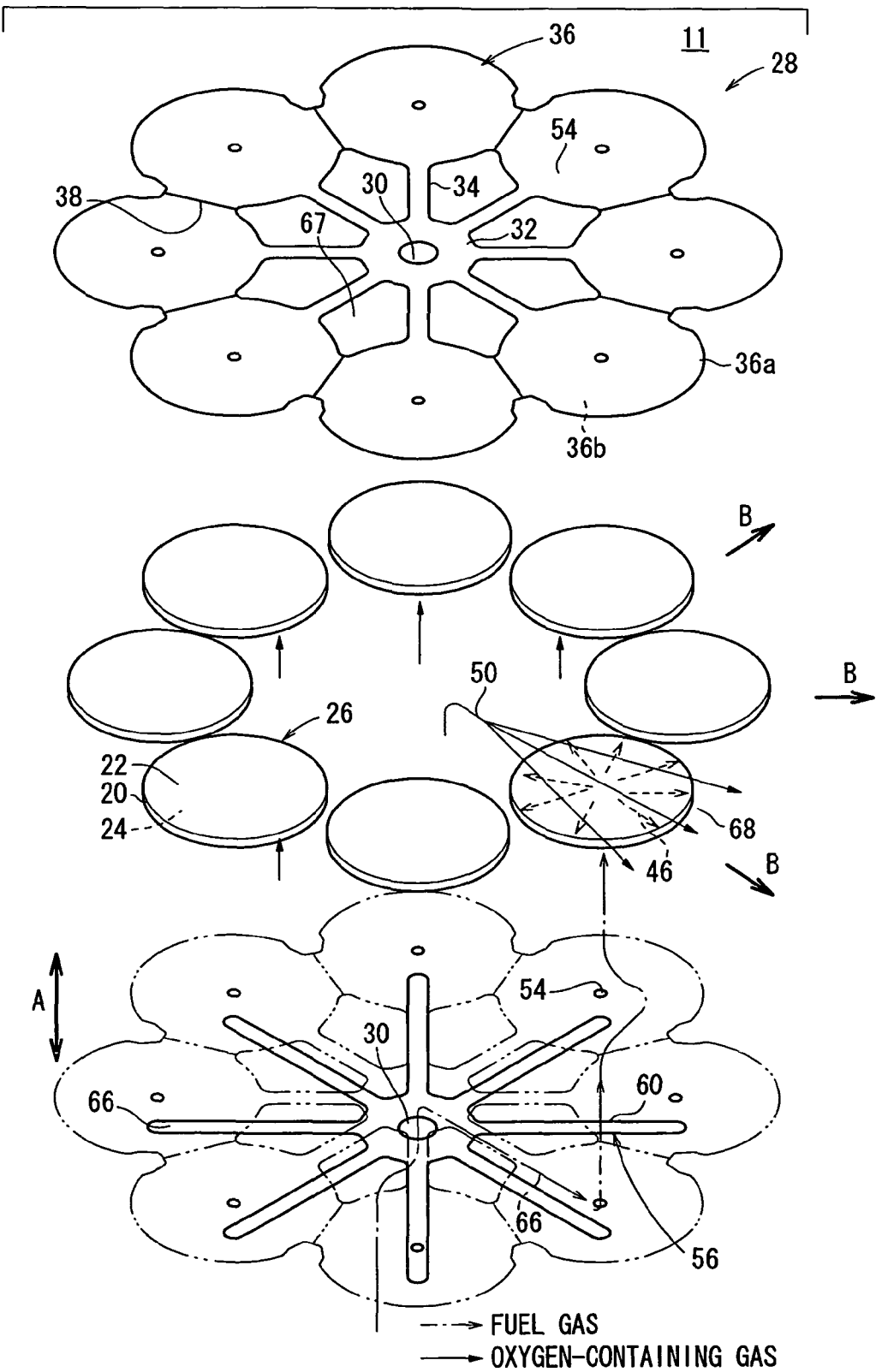
FIG. 4 is a partial exploded perspective view showing gas flows in the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the inner circumferential edge of the electrolyte electrode assembly 26 (central portion of the separator 28) for preventing the entry of the oxygen-containing gas.

A plurality of, e.g., eight electrolyte electrode assemblies 26 are interposed between a pair of separators 28 to form the fuel cell 11. The eight electrolyte electrode assemblies 26 are concentric with a fuel gas supply passage 30 extending through the center of the separators 28.

In FIG. 3, for example, each of the separators 28 comprises a metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size. The adjacent circular disks 36 are separated from each other by slits 38.

Each of the circular disks 36 has first protrusions 48 on its surface 36a which contacts the anode 24. The first protrusions 48 form a fuel gas channel 46 for supplying a fuel gas along an electrode surface of the anode 24. Each of the circular disks 36 has second protrusions 52 on its surface 36b which contacts the cathode 22. The second protrusions 52 form an oxygen-containing gas channel 50 for supplying the oxygen-containing gas along an electrode surface of the cathode 22 (see FIG. 5).

Figure 6:
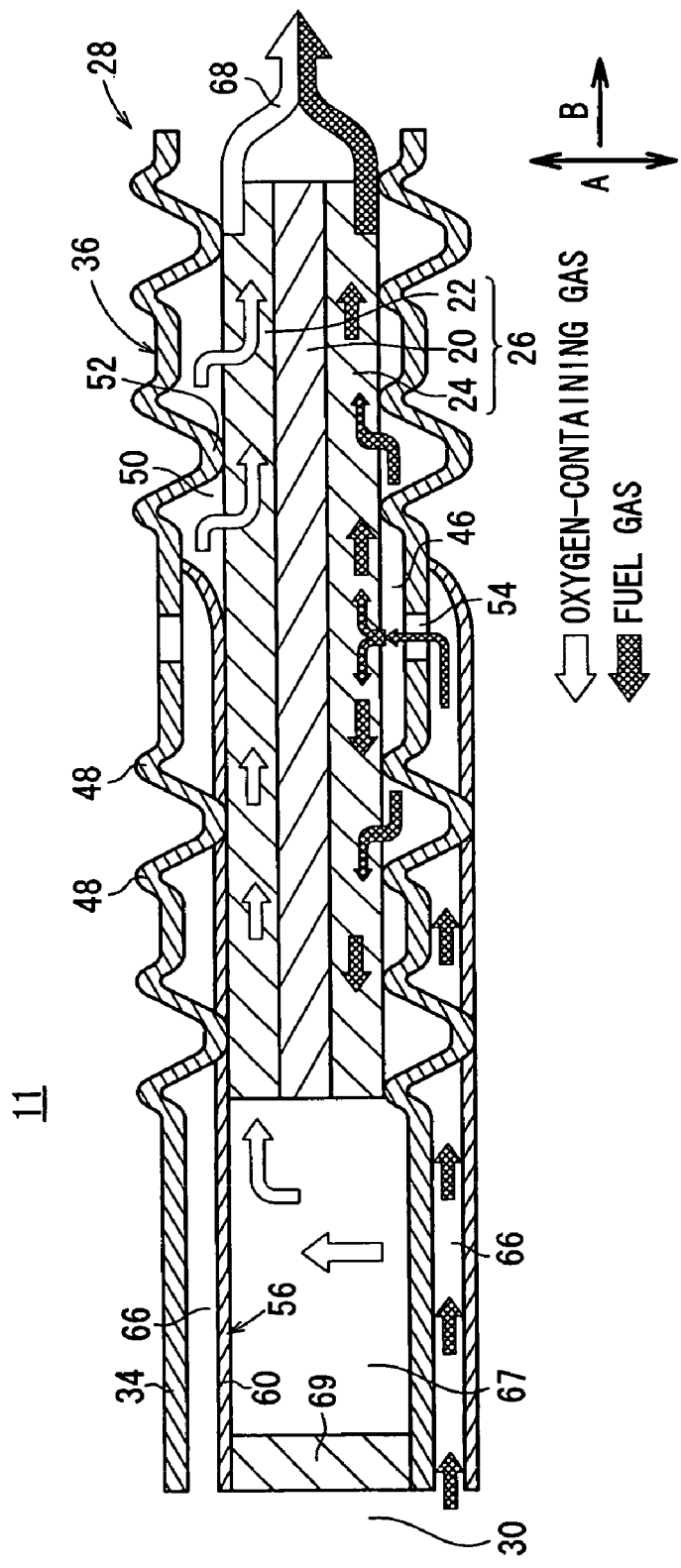
FIG. 6 is a cross sectional view schematically showing operation of the fuel cell.

As shown in FIG. 6, the first protrusions 48 and the second protrusions 52 protrude away from each other. The first protrusions 48 are ring shaped protrusions, and the second protrusions 52 are mountain shaped protrusions. The second protrusions (mountain shaped protrusions) 52 are surrounded by the first protrusions (ring shaped protrusions) 48.

Figure 5:
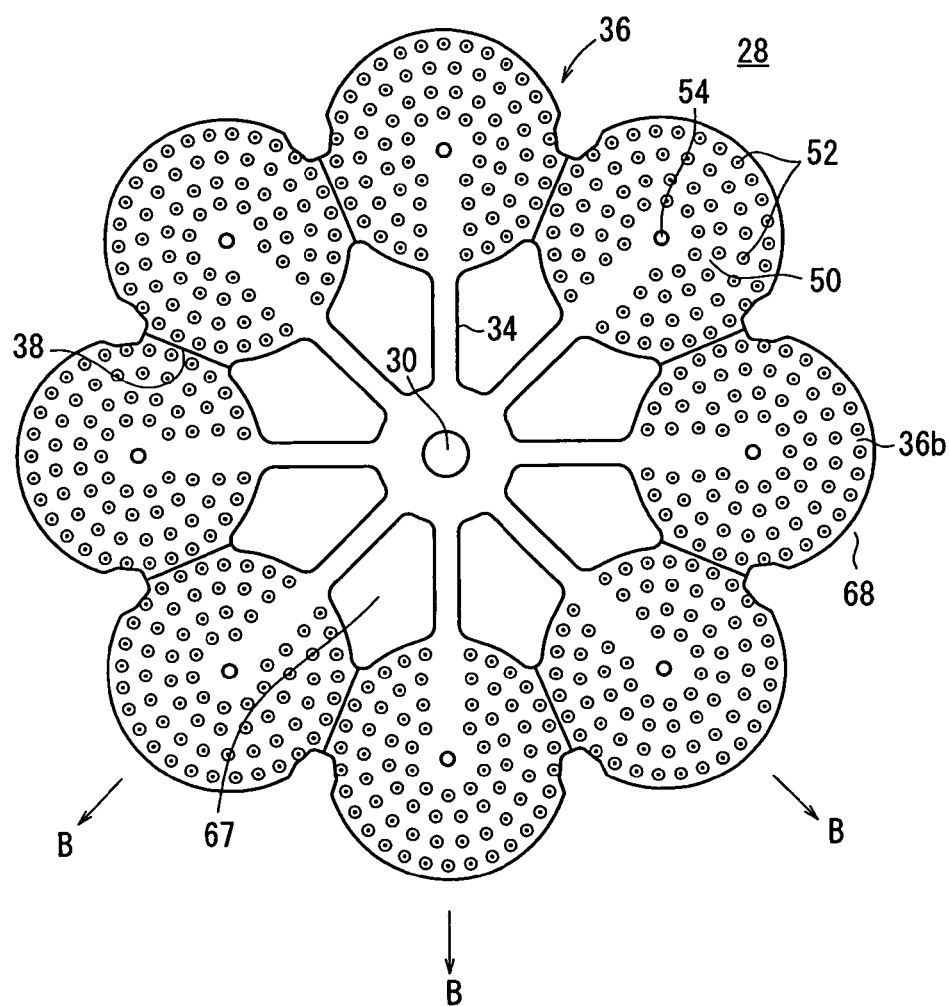
FIG. 5 is a front view showing the separator.

As shown in FIGS. 3 to 5, a fuel gas inlet 54 is provided in each of the circular disks 36. The fuel gas flows through the fuel gas inlet 54 into the fuel gas channel 46. The position of the fuel gas inlet 54 is determined so that the fuel gas can be distributed uniformly. For example, the fuel gas inlet 54 is provided at the center of the circular disk 36.

A channel member 56 is fixed to the separator 28 by brazing or laser welding on a surface facing the cathode 22. As shown in FIG. 3, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. The recess 64 prevents the flow of the brazing material, and achieves the uniform flow of the fuel gas. A fuel gas supply channel 66 is formed between the first and second bridges 34, 60. The fuel gas supply channel 66 is connected to the fuel gas channel 46 through the slits 62 and the recess 64 from the fuel gas supply passage 30.

As shown in FIG. 6, the oxygen-containing gas channel 50 is connected to an oxygen-containing gas supply unit 67. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 67 is formed by spaces between the first bridges 34 inside the respective circular disks 36, and extends in the stacking direction.

Insulating seals 69 for sealing the fuel gas supply passage 30 is provided between the separators 28. For example, the insulating seals 69 are made of mica material, or ceramic material. An exhaust gas channel 68 extends through the fuel cells 11 in the stacking direction outside the respective circular disks 36.

As shown in FIGS. 1 and 2, the fuel cell stack 12 includes a plurality of fuel cells 11 stacked together, and end plates 70a, 70b provided at opposite ends in the stacking direction. The end plate 70a has a substantially circular disk shape. A ring shaped portion 72 is formed in the outer circumferential region of the end plate 70a. The ring shaped portion 72 axially protrudes from the end plate 70a. A groove 74 is formed around the ring shaped portion 72. A columnar protrusion 76 is provided at the center of the ring shaped portion 72. The columnar protrusion 76 and the ring shaped portion 72 protrude from the end plate 70a in the same direction. A hole 78 is formed at the center of the protrusion 76.

Figure 7:
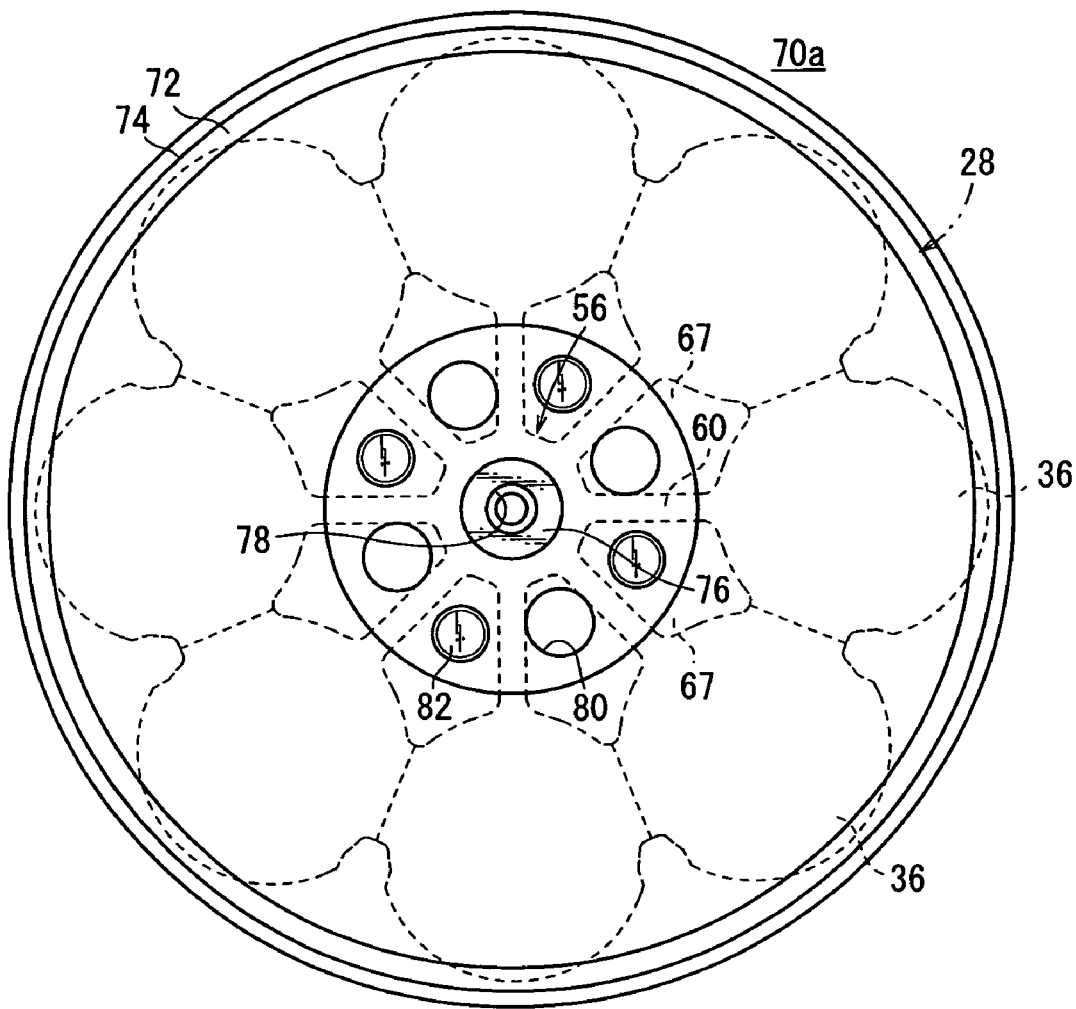
FIG. 7 is a front view showing an end plate of the fuel cell stack.

In the end plate 70a, holes 80 and screw holes 82 are formed alternately along a virtual circle around the protrusion 76 at equal angles (intervals). As shown in FIG. 7, the holes 80 and the screw holes 82 are provided at positions corresponding to respective spaces of the oxygen-containing gas supply unit 67 formed between the first and second bridges 34, 60. As shown in FIG. 1, the diameter of the end plate 70b is larger than the diameter of the end plate 70a. The end plate 70b is a thin electrically conductive plate.

The casing 18 includes a first case unit 86a containing the load applying mechanism 21 and a second case unit 86b containing the fuel cell stack 12. The end plate 70b and an insulating member are sandwiched between the first case unit 86a and the second case unit 86b. The insulating member is provided on the side of the second case unit 86b. The joint portion between the first case unit 86a and the second case unit 86b is tightened by screws 88 and nuts 90. The end plate 70b functions as a heat barrier for preventing entry of the hot exhaust gas or the hot air from the fluid unit 19 into the load applying mechanism 21.

An end of a ring shaped wall plate 92 is joined to the second case unit 86b, and a head plate 94 is fixed to the other end of the wall plate 92. The fluid unit 19 is provided symmetrically with respect to the central axis of the fuel cell stack 12. Specifically, the substantially cylindrical reformer 16 is provided coaxially inside the substantially ring shaped heat exchanger 14.

A wall plate 96 is fixed to the groove 74 around the end plate 70a to form a chamber unit 98 between the end plate 70a and the wall plate 96. The heat exchanger 14 and the reformer 16 are directly connected to the chamber unit 98. The air is heated when it flows through the heat exchanger 14, and temporarily fills a chamber 98a of the chamber unit 98. The holes 80 are opened for supplying the air temporarily in the chamber 98a to the fuel cell stack 12.

A fuel gas supply pipe 100 and a reformed gas supply pipe 102 are connected to the reformer 16. The fuel gas supply pipe 100 extends to the outside from the head plate 94. The reformed gas supply pipe 102 is inserted into the hole 78 of the end plate 70a, and connected to the fuel gas supply passage 30.

An air supply pipe 104 and an exhaust gas pipe 106 are connected to the head plate 94. A channel 108 extending from the air supply pipe 104 to the chamber unit 98 through the heat exchanger 14 and a channel 110 extending from the exhaust gas channel 68 of the fuel cell stack 12 to the exhaust gas pipe 106 through the heat exchanger 14 are provided in the casing 18.

The load applying mechanism 21 includes a first tightening unit 112a for applying a first tightening load T1 to a region around (near) the fuel gas supply passage 30 and a second tightening unit 112b for applying a second tightening load T2 to the electrolyte electrode assemblies 26. The second tightening load T2 is smaller than the first tightening load T1 (T1>T2).

Figure 8:
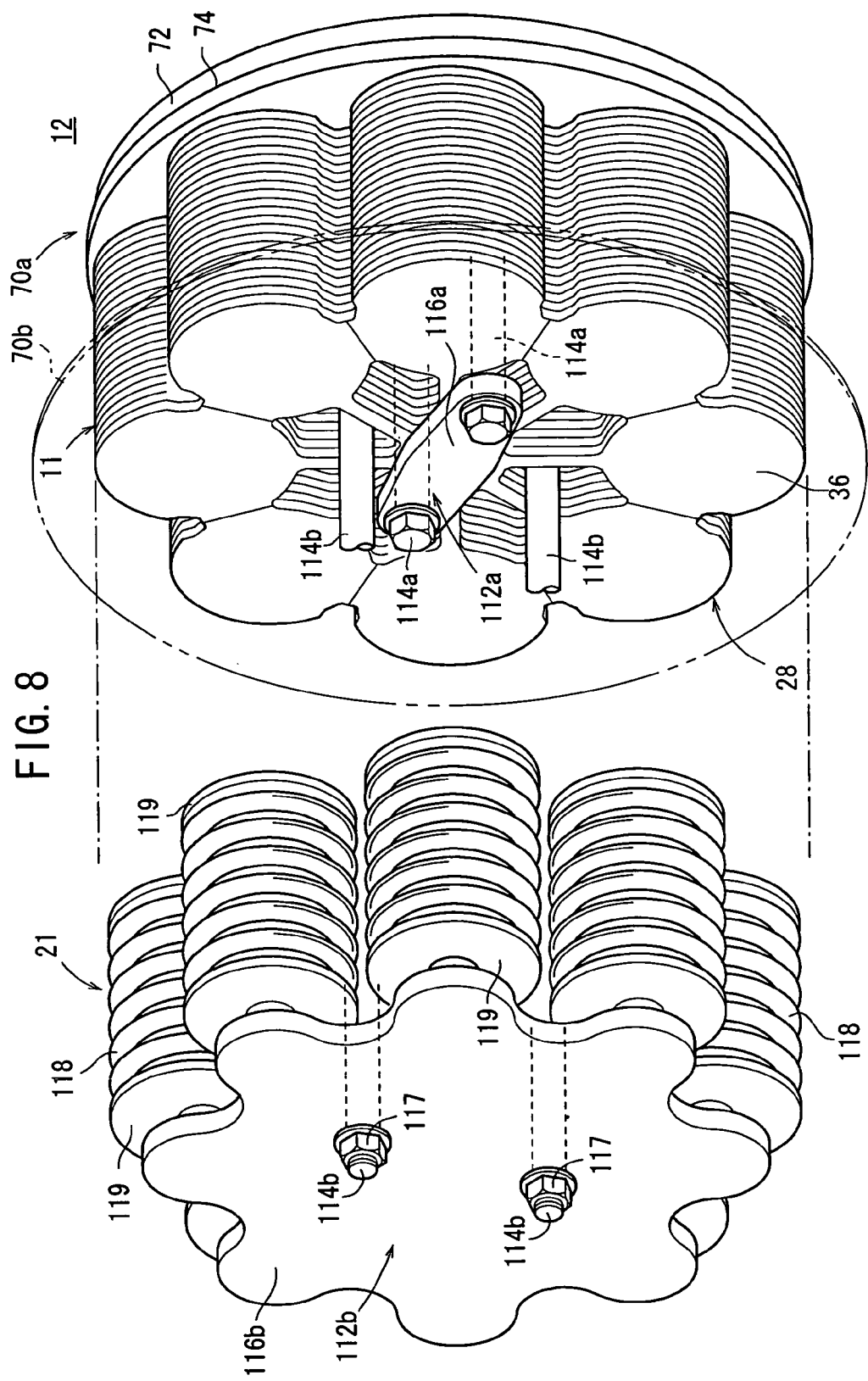
FIG. 8 is a partial exploded perspective view showing a load applying mechanism of the fuel cell system.

As shown in FIGS. 1, 2, and 8, the first tightening unit 112a includes short first tightening bolts 114a screwed into the screw holes 82 formed along one diagonal line of the end plate 70a. The first tightening bolts 114a extend in the stacking direction of the fuel cells 11, and engage a first presser plate 116a. The first tightening bolts 114a are provided in the oxygen-containing gas supply unit 67 in the separators 28. The first presser plate 116a is a narrow plate, and engages the central position of the separator 28 to cover the fuel gas supply passage 30.

The second tightening unit 112b includes long second tightening bolts 114b screwed into the screw holes 82 formed along the other diagonal line of the end plate 70a. Ends of the second tightening bolts 114b extend through a second presser plate 116b having a curved outer section. Nuts 117 are fitted to the ends of the second tightening bolts 114b. The second tightening bolts 114b are provided in the oxygen-containing gas supply unit 67 in the separators 28. Springs 118 and spring seats 119 are provided in respective circular portions of the second presser plate 116b, at positions corresponding to the electrolyte electrode assemblies 26 on the circular disks 36 of the fuel cell 11. For example, the springs 118 are ceramics springs.

Operation of the fuel cell system 10 will be described below.

As shown in FIG. 3, in assembling the fuel cell system 10, firstly, the separator 28 is joined to the channel member 56 on its surface facing the cathode 22. Therefore, the fuel gas supply channel 66 connected to the fuel gas supply passage 30 is formed between the separator 28 and the channel member 56. The fuel gas supply channel 66 is connected to the fuel gas channel 46 through the fuel gas inlet 54 (see FIG. 6). The ring shaped insulating seal 69 is provided on each of the separators 28 around the fuel gas supply passage 30.

In this manner, the separator 28 is fabricated. Eight electrolyte electrode assemblies 26 are interposed between the separators 28 to form the fuel cell 11. As shown in FIGS. 3 and 4, the electrolyte electrode assemblies 26 are interposed between the surface 36*a* of one separator 28 and the surface 36*b* of the other separator 28. The fuel gas inlet 54 of the circular disk 36 is positioned at the center in each of the anodes 24.

A plurality of the fuel cells 11 are stacked in the direction indicated by the arrow A, and the end plates 70*a*, 70*b* are provided at opposite ends in the stacking direction. As shown in FIGS. 1, 2 and 8, the first presser plate 116*a* of the first tightening unit 112*a* is provided at the center of the fuel cell 11.

In this state, the short first tightening bolts 114*a* are inserted through the first presser plate 116*a* and the end plate 70*b* toward the end plate 70*a*. Tip ends of the first tightening bolts 114*a* are screwed into, and fitted to the screw holes 82 formed along one of the diagonal lines of the end plate 70*a*. The heads of the first tightening bolts 114*a* engage the first presser plate 116*a*. The first tightening bolts 114*a* are screwed in the screw holes 82 to adjust the surface pressure of the first presser plate 116*a*. In this manner, in the fuel cell stack 12, the first tightening load T1 is applied to the region near the fuel gas supply passage 30.

Then, the springs 118 and the spring seats 119 are aligned axially with the electrolyte electrode assemblies 26 at respective positions of the circular disks 36. The second presser plate 116*b* of the second tightening unit 112*b* engage the spring seats 119 provided at one end of the springs 118.

Then, the long second tightening bolts 114*b* are inserted through the second presser plate 116*b* and the end plate 70*b* toward the end plate 70*a*. The tip end of the second tightening bolts 114*b* are screwed into, and fitted to the screw holes 82 formed along the other diagonal line of the end plate 70*a*. The nuts 117 are fitted to the heads of the second tightening bolts 114*b*. Therefore, by adjusting the state of the screw engagement between the nuts 117 and the second tightening bolts 114*b*, the second tightening load T2 is applied to the electrolyte electrode assemblies 26 by the elastic force of the respective springs 118.

The end plate 70*b* of the fuel cell stack 12 is sandwiched between the first case unit 86*a* and the second case unit 86*b* of the casing 18. The first case unit 86*a* and the second case unit 86*b* are fixed together by the screws 88 and the nuts 90. The fluid unit 19 is mounted in the second case unit 86*b*. The wall plate 96 of the fluid unit 19 is attached to the groove 74 around the end plate 70*a*. Thus, the chamber unit 98 is formed between the end plate 70*a* and the wall plate 96.

Next, in the fuel cell system 10, as shown in FIG. 1, a fuel (methane, ethane, propane, or the like) and, as necessary, water are supplied from the fuel gas supply pipe 100, and an oxygen-containing gas (hereinafter referred to as the "air") is supplied from the air supply pipe 104.

The fuel is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 66 through the slits 62 in the separator 28 of each fuel cell 11 (see FIG. 6).

The fuel gas flows along the fuel gas supply channel 66 between the first and second bridges 34, 60, and flows into the fuel gas channel 46 from the fuel gas inlets 54 of the circular disks 36. The fuel gas inlets 54 are formed at positions corresponding to central regions of the anodes 24 of the electrolyte electrode assemblies 26. Thus, the fuel gas is supplied to from the fuel gas inlets 54 to the substantially central positions of the anodes 24, and flows outwardly from the central regions of the anodes 24 along the fuel gas channel 46.

As shown in FIG. 1, the air from the air supply pipe 104 flows through the channel 108 of the heat exchanger 14, and temporarily flows into the chamber 98*a*. The air flows through the holes 80 connected to the chamber 98*a*, and is supplied to the oxygen-containing gas supply unit 67 provided at substantially the center of the fuel cells 11. At this time, in the heat exchanger 14, as described later, since the exhaust gas discharged to the exhaust gas channel 68 flows through the channel 110, heat exchange between the air before supplied to the fuel cells 11 and the exhaust gas is performed. Therefore, the air is heated to a desired fuel cell operating temperature beforehand.

The air supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 6, in the oxygen-containing gas channel 50, the air flows from the inner circumferential edge (central region of the separator 28) to the outer circumferential edge (outer region of the separator 28) of, i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the air flows in one direction indicted by the arrow B on the electrode surface of the cathode 22. At this time, oxygen ions flow through the electrolyte 20 toward the anode 24 for generating electricity by electrochemical reactions.

The exhaust gas discharged to the outside of the respective electrolyte electrode assemblies 26 flows through the exhaust gas channel 68 in the stacking direction. When the exhaust gas flows through the channel 110 of the heat exchanger 14, heat exchange between the exhaust gas and the air is carried out. Then, the exhaust gas is discharged into the exhaust gas pipe 106.

In the first embodiment, the chamber unit 98 is formed at the end plate 70*a*, i.e., on one side of the fuel cell stack 12 where the end plate 70*a* is provided. The air heated by the heat exchanger 14 temporarily fills the chamber 98*a* of the chamber unit 98, and thus, the temperature becomes uniform in the entire end plate 70*a*. No heat distortion occurs in the end plate 70*a*, and heat distortion in the entire fuel cell stack 12 is reduced effectively. Since heat radiation from the end plate 70*a* is reduced, it is possible to maintain uniform operating temperature in the fuel cell stack 12.

Further, since the heated air temporarily fills the chamber 98*a*, the flow rate of the air supplied to the chamber 98*a* is kept at a certain level. Therefore, the flow rate of the air supplied to the fuel cells 11 does not change, and power generation is performed uniformly in each of the fuel cells 11.

Further, the chamber unit 98 is directly connected to the heat exchanger 14 and the reformer 16. Since the chamber unit 98 is connected to the heat exchanger 14 without requiring any pipes, heat radiation from the pipes does not occur between the chamber unit 98 and the heat exchanger 14. Consequently, heat radiation from the pipes during power generation of the fuel cells 11 is reduced, and it is possible to reduce heat loss suitably. Further, since no pipes are required for connecting the heat exchanger 14 and the chamber unit 98, the overall weight of the fuel cell stack 12 is reduced, and the volume of the fuel cell stack 12 is reduced by elimination of the pipes. It is possible to reduce the size of the fuel cell stack 12.

Further, the heat generated in the fuel cells 11 and the heat of the air temporarily in the chamber 98a are used for warming the end plate 70a. Therefore, heat radiation from the end plate 70a is reduced. Since no pipes are required, no heat radiation from the pipes occurs. Improvement in starting operation of the fuel cell stack 12 is achieved.

Further, in the casing 18, the fluid unit 19 including the heat exchanger 14 and the reformer 16 is directly connected to the fuel cell stack 12, and only provided on one side of the casing 18. Therefore, heat radiation area in the entire fluid unit 19 is reduced, and reduction in heat loss is achieved easily. Further, the fluid unit 19 which receives, or radiates heat is disposed inside the casing 18. Therefore, the volume associated with the fluid unit 19 is reduced, and the amount of heat radiation from the fluid unit 19 is reduced. Consequently, improvement in the heat efficiency is achieved.

Further, the reformer 16 is provided inside the heat exchanger 14, and the heat exchanger 14 and the reformer 16 are provided symmetrically with respect to the central axis of the fuel cell stack 12. Therefore, heat insulation for the reformer 16 is improved. It is possible to reduce the heat stress generated in the fluid unit 19.

Figure 9:
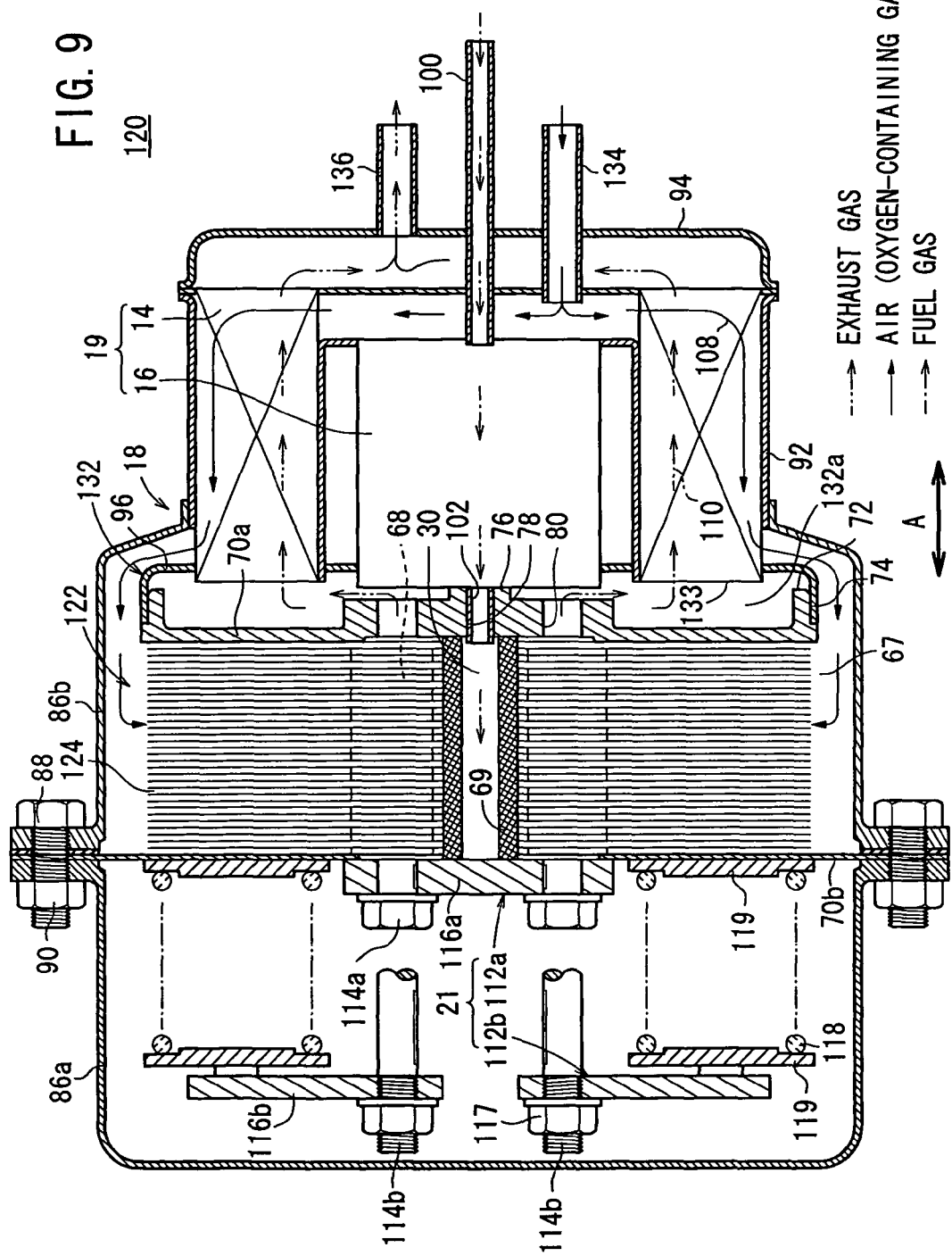
FIG. 9 is a partial cross sectional view showing a fuel cell system according to a second embodiment of the present invention.

FIG. 9 is a cross sectional view showing a fuel cell system 120 according to a second embodiment of the present invention. The constituent elements that are identical to those of the fuel cell system 10 according to the first embodiment are labeled with the same reference numeral, and description thereof will be omitted. In a third embodiment as described later, the constituent elements that are identical to those of the fuel cell system 10 according to the first embodiment are labeled with the same reference numeral, and description thereof will be omitted.

The fuel cell system 120 includes a fuel cell stack 122 provided in the casing 18. The fuel cell stack 122 is formed by stacking a plurality of fuel cells 124 in the direction indicated by the arrow A. The fuel cell stack 122 is sandwiched between the end plates 70a, 70b.

Figure 10:
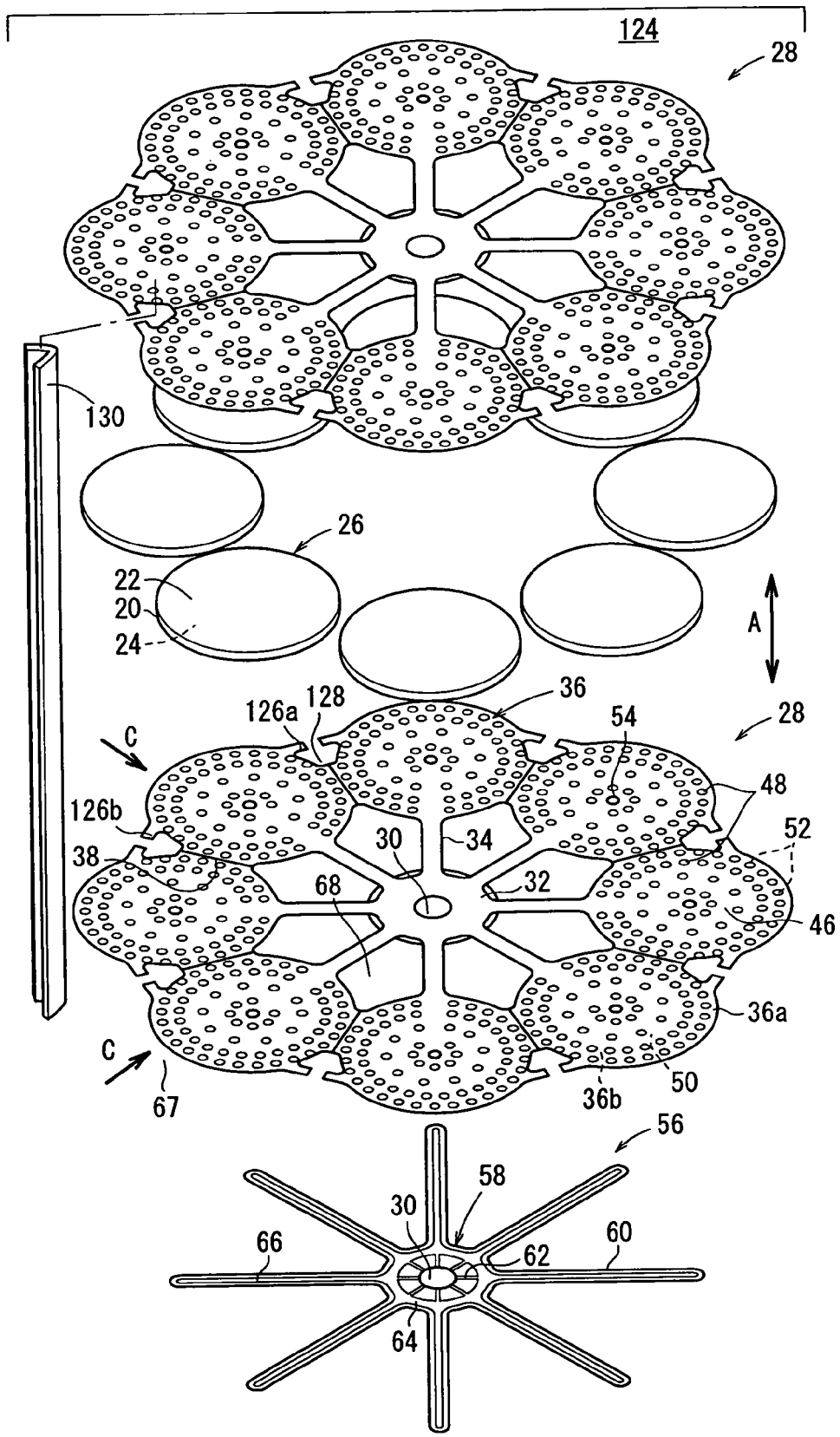
FIG. 10 is an exploded perspective view showing the fuel cell of the fuel cell stack.
Figure 11:
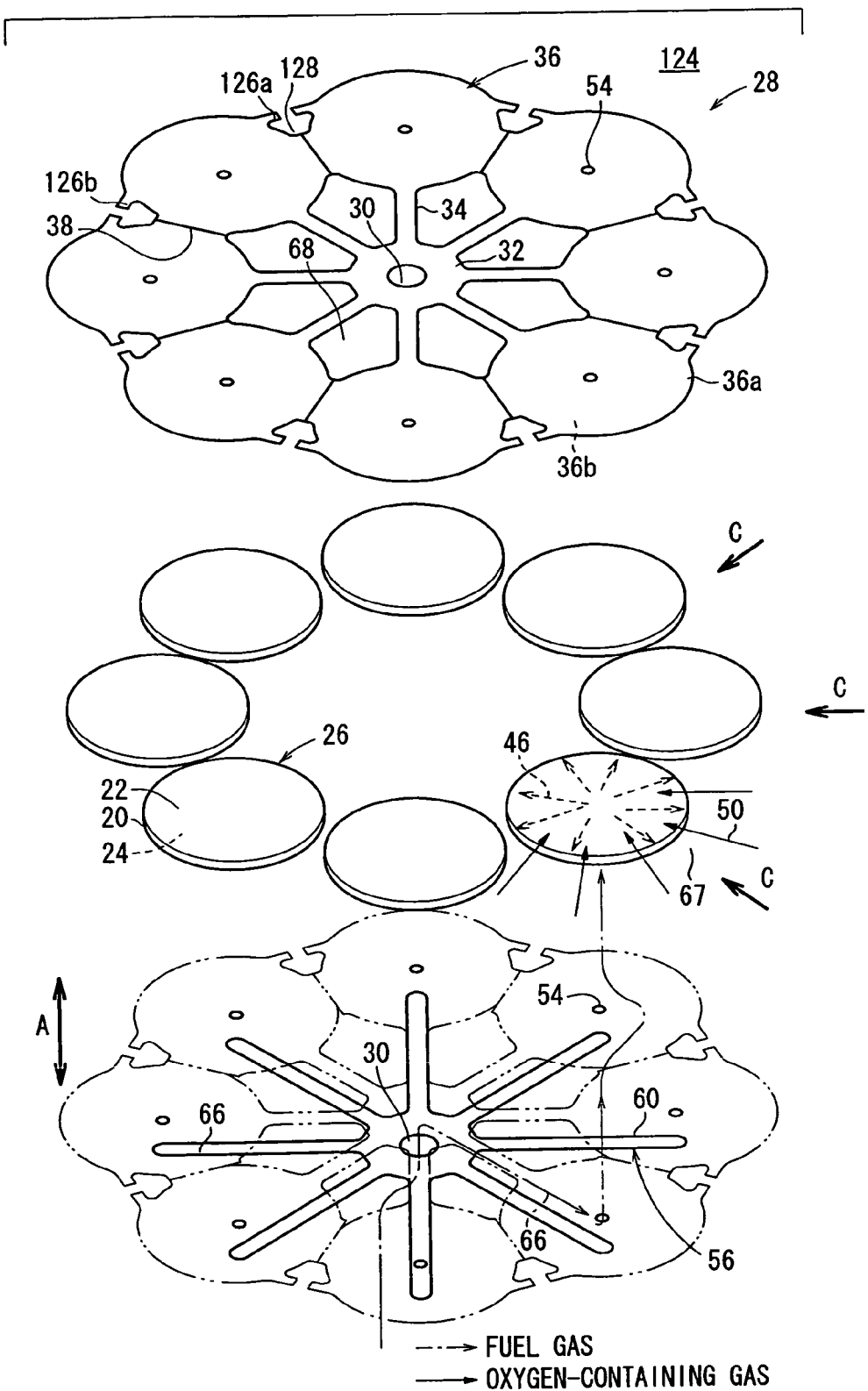
FIG. 11 is a partial exploded perspective view showing gas flows in the fuel cell.

As shown in FIGS. 10 and 11, in the fuel cell 124, the oxygen-containing gas flows along the cathode 22 of the electrolyte electrode assembly 26 in the direction indicated by an arrow C from the outer circumferential edge to the inner circumferential edge of the cathode 22, i.e., in the direction opposite to the flow direction in the case of the first embodiment.

An oxygen-containing gas supply unit 67 is provided outside the circular disks 36. An exhaust gas channel 68 is formed by spaces between the first bridges 34 inside the circular disks 36. The exhaust gas channel 68 extends in the stacking direction. Each of the circular disks 36 includes extensions 126a, 126b protruding toward the adjacent circular disks 36 on both sides, respectively. Spaces 128 are formed between the adjacent extensions 126a, 126b. Baffle plates 130 are provided in the respective spaces 128. The baffle plates 130 extend along the spaces 128 in the stacking direction.

Figure 12:
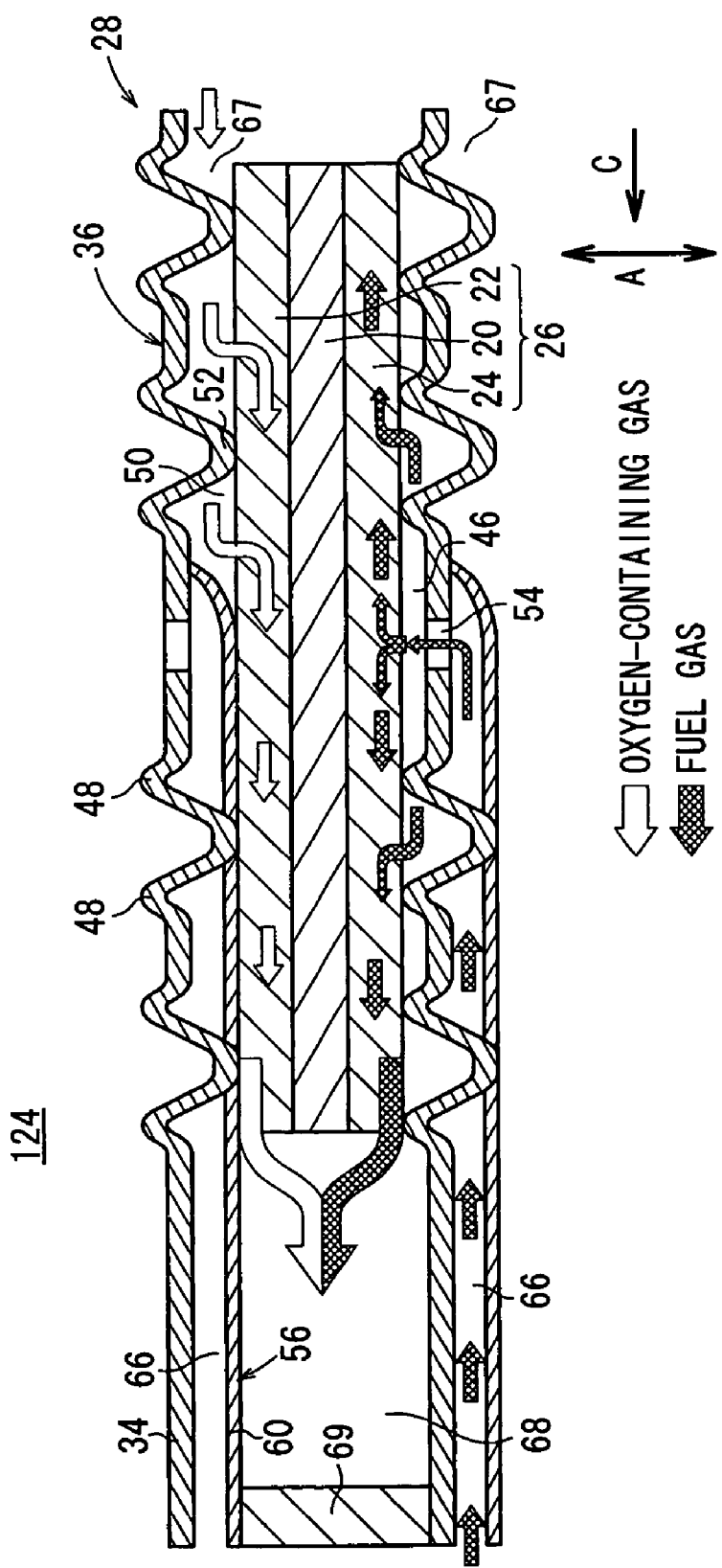
FIG. 12 is a cross sectional view schematically showing operation of the fuel cell.

As show in FIG. 12, the oxygen-containing gas channel 50 is connected to the oxygen-containing gas supply unit 67 for supplying the oxygen-containing gas from the spaces between the outer regions of the circular disks 36 and the outer regions of the electrolyte electrode assemblies 26 in the direction indicated by the arrow C. The oxygen-containing gas supply unit 67 is formed around the separators 28 including area outside the extensions 126a, 126b of the circular disks 36.

As shown in FIG. 9, a chamber unit 132 having a chamber 132a connected to the exhaust gas channel 68 through a hole 80 is formed at the end plate 70a. The exhaust gas discharged from the fuel cells 124 temporarily fills the chamber 132a. The exhaust gas flows through the channel 110 in the heat exchanger 14 through an opening 133 opened directly to the chamber 132a.

An air supply pipe 134 and an exhaust gas pipe 136 are connected to the head plate 94. The air supply pipe 134 extends to a position near the reformer 16. An end of the exhaust gas pipe 136 is connected to the head plate 94.

In the second embodiment, the fuel gas flows from the fuel gas supply pipe 100 to the fuel gas supply passage 30 through the reformer 16. The air as the oxygen-containing gas flows from the air supply pipe 134 into the channel 108 in the heat exchanger 14, and is supplied to the oxygen-containing gas supply unit 67 outside the fuel cells 124. As shown in FIG. 12, the air flows from the spaces between the outer regions of the electrolyte electrode assemblies 26 and the outer regions of the circular disks 36 in the direction indicated by the arrow C, and is supplied to the oxygen-containing gas channel 50 in each of the electrolyte electrode assemblies 26.

Thus, power generation is performed in the electrolyte electrode assemblies 26. The exhaust gas as the mixture of the fuel gas and the air after consumption in the reactions of the power generation flows in the stacking direction through the exhaust gas channel 68 in the separators 28. The exhaust gas flows through the holes 80, and temporarily fills the chamber 132a of the chamber unit 132 formed at the end plate 70a. Further, when the exhaust gas flows through the channel 110 into the heat exchanger 14, heat exchange is performed between the exhaust gas and the air. Then, the exhaust gas is discharged into the exhaust gas pipe 136.

In the second embodiment, the exhaust gas consumed in the reactions in the respective fuel cell 124 temporarily fills the chamber 132a. Therefore, the entire end plate 70a is heated uniformly. Further, the opening 133 for supplying the exhaust gas to the heat exchanger 14 is directly opened to the chamber 132a. Pipe for releasing the exhaust heat are not required. Thus, the same advantages as in the case of the first embodiment can be obtained. For example, heat distortion in the entire fuel cell stack 122 is reduced effectively, and improvement in the heat efficiency is achieved.

Figure 13:
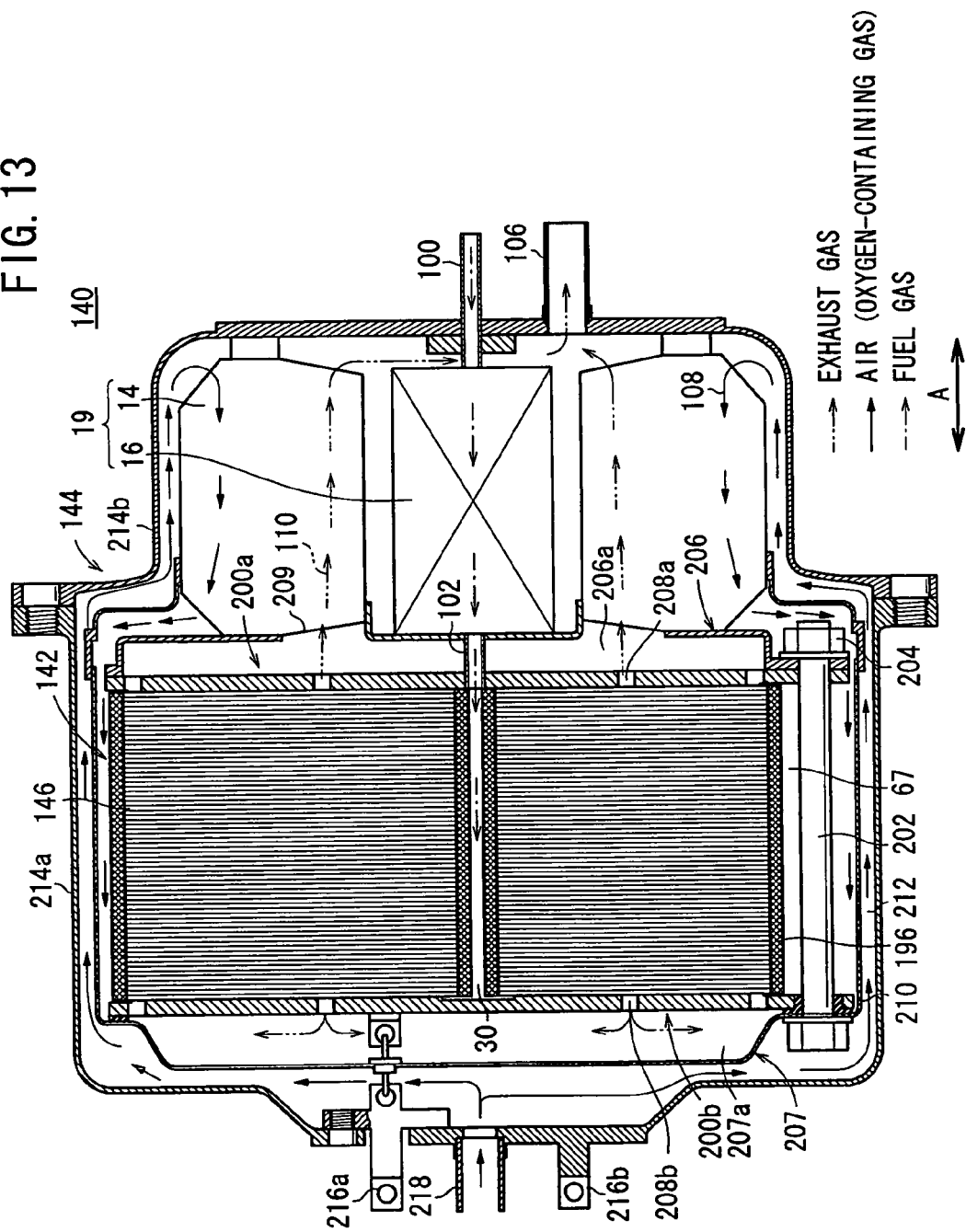
FIG. 13 is a partial cross sectional view showing a fuel cell system according to a third embodiment of the present invention.

FIG. 13 is a cross sectional view showing a fuel cell system 140 according to the third embodiment of the present invention.

The fuel cell system 140 includes a fuel cell stack 142. The fuel cell stack 142, the heat exchanger 14, and the reformer 16 are provided in a casing 144. The fuel cell stack 142 is formed by stacking a plurality of fuel cells 146 in the direction indicated by the arrow A.

Figure 14:
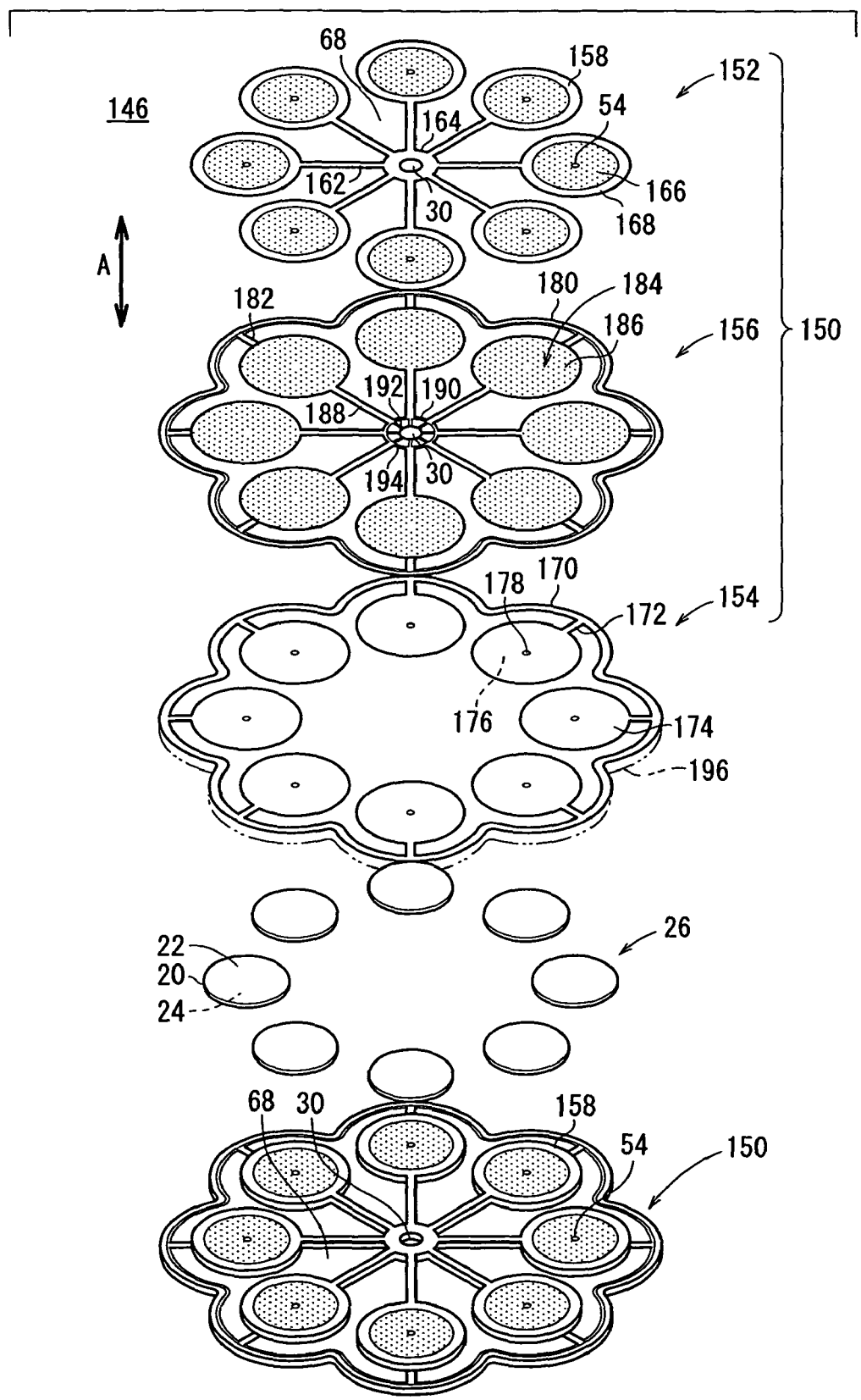
FIG. 14 is an exploded perspective view schematically showing the fuel cell of the fuel cell system.
Figure 15:
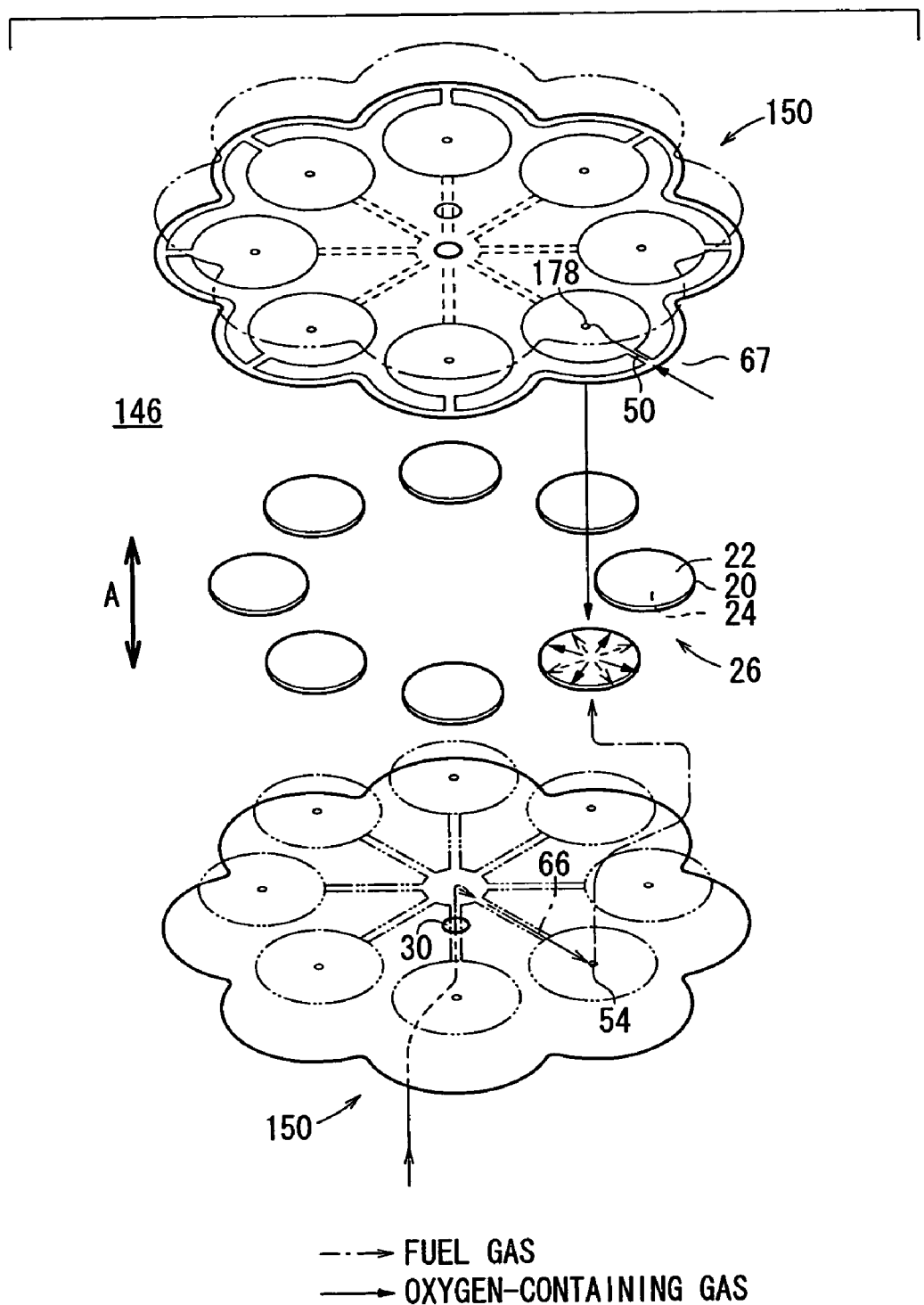
FIG. 15 is a partial exploded perspective view showing gas flows in the fuel cell.

As shown in FIGS. 14 and 15, the fuel cell 146 includes a plurality of, e.g., eight electrolyte electrode assemblies 26 between a pair of separators 150. Each of the separators 150 includes a first plate 152, a second plate 154, and a third plate 156 interposed between the first and second plates 152, 154. For example, the first to third plates 152, 154, 156 are metal plates of, e.g., stainless alloy.

The first plate 152 includes a first small diameter end portion 164 and eight first circular disks 158 connected to the first small diameter end portion 164 through narrow bridges 162. A fuel gas supply passage 30 extends through the first small diameter end portion 164. Each of the first circular disks 158 has first protrusions 166 and a ring shaped protrusion 168 around the first protrusions 166. Fuel gas inlets 54 are formed at the respective centers of the first circular disks 158. An exhaust gas channel 68 extends in the direction indicated by the arrow A, inside the first circular disks 158.

The second plate 154 has a curved outer section 170. At each curved portion of the curved outer section 170, a second circular disk 174 is formed integrally with the curved outer section 170 through a bridge 172 extending inwardly from the curved outer section 170. The second circular disk 174 has second protrusions 176 which contact the cathode 22 of the electrolyte electrode assembly 26. Oxygen-containing gas inlets 178 are formed at the respective centers of the second circular disks 174.

The third plate 156 includes a curved outer section 180. At each curved portion of the curved outer section 180, a third circular disk 184 is formed integrally with the curved outer section 180 through a bridge 182 extending inwardly from the curved outer section 180. The third circular disk 184 has third protrusions 186 on its surface facing the first plate 152. The third circular disk 184 is connected to a second small diameter end portion 190 through a bridge 188. A plurality of slits 192 connected to the fuel gas supply passage 30 are formed radially in the second small diameter end portion 190. The slits 192 are connected to a recess 194 formed in an outer circumferential region of the second small diameter end portion 190.

Figure 16:
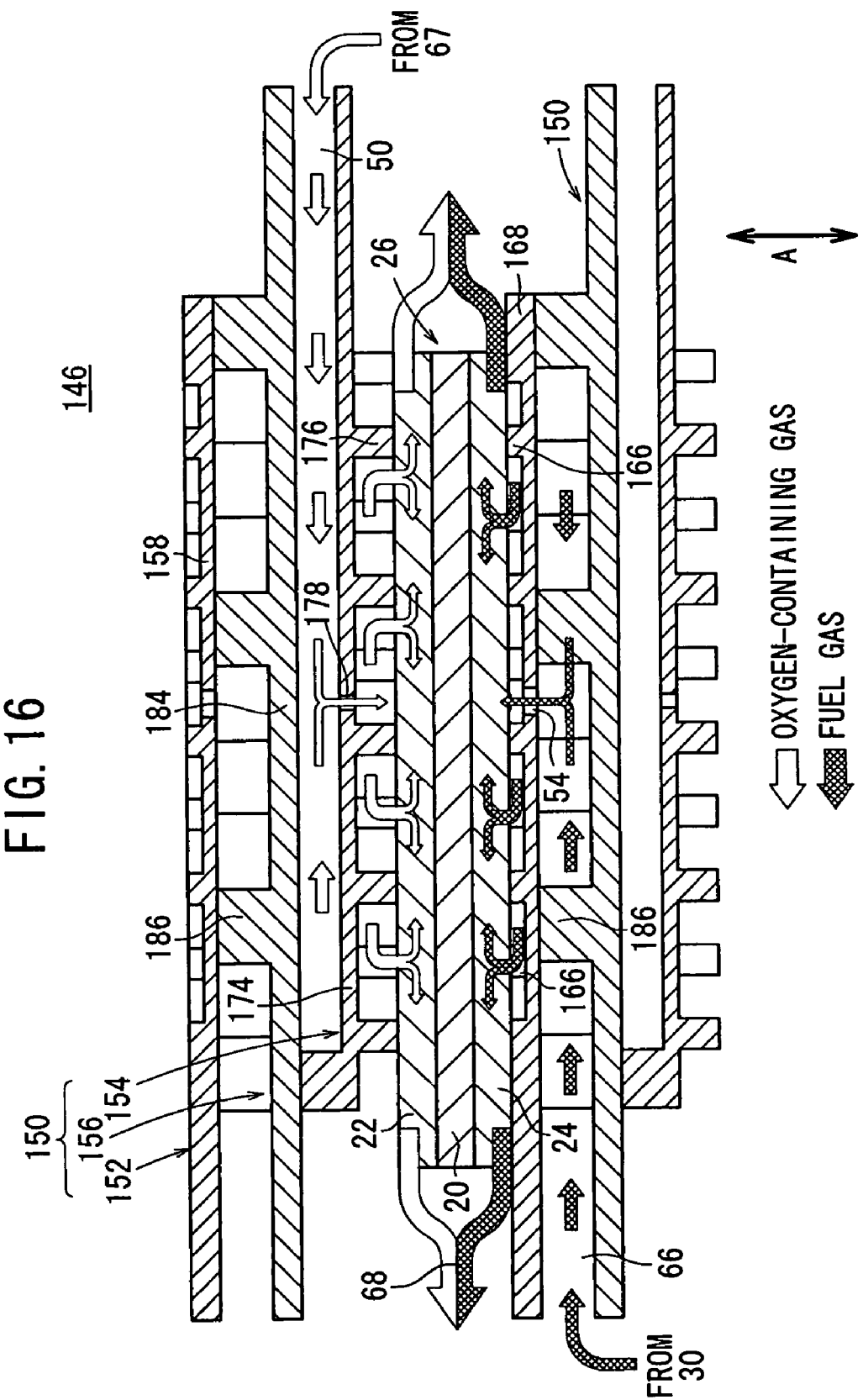
FIG. 16 is a cross sectional view schematically showing operation of the fuel cell.

As shown in FIG. 16, a fuel gas supply channel 66 is formed between the first and third plates 152, 156 and an oxygen-containing gas channel 50 is formed between the second and third plates 154, 156. An insulating seal 196 is provided along the outer section 170 between the first and second plates 152, 154 sandwiching the electrolyte electrode assemblies 26 (see FIG. 14).

As shown in FIG. 13, the fuel cell stack 142 includes end plates 200a, 200b provided at opposite ends of the fuel cells 146 in the stacking direction. A tightening bolt 202 is inserted into outer regions of the end plates 200a, 200b. A nut 204 is fitted to a tip end of the tightening bolt 202 for applying a tightening load to components between the end plates 200a, 200b.

The tightening bolt 202 is electrically connected to the end plate 200a, and electrically insulated from the end plate 200b. A first chamber unit 206 for the exhaust gas is formed at the end plate 200a. Further, a second chamber unit 207 for the exhaust gas is formed at the end plate 200b.

The first chamber unit 206 is formed between the end plate 200a and the fluid unit 19. A chamber 206a in the first chamber unit 206 is connected to the exhaust gas channel 68 through a plurality of holes 208a in the end plate 200a. The first chamber unit 206 has an opening 209 which is directly opened to the chamber 206a for supplying the exhaust gas temporarily in the chamber 206a to the channel 110 of the heat exchanger 14. The second chamber unit 207 is formed between the end plate 200b and an inner wall plate 210. The second chamber unit 207 has a chamber 207a connected to the exhaust gas channel 68 through a plurality of holes 208b. Opposite ends of the inner wall plate 210 are fixed to the outer region of the heat exchanger 14 to form an air channel 212 in the casing 144.

The casing 144 includes a first case unit 214a containing the fuel cell stack 142 and a second case unit 214b containing the fluid unit 19. The first case unit 214a has a first output terminal 216a electrically connected to the end plate 200b, and a second output terminal 216b electrically connected to the end plate 200a through the heat exchanger 14 and the second case unit 214b. The first output terminal 216a is electrically insulted from the first case unit 214a and the inner wall plate 210.

An air supply pipe 218 is connected to the first case unit 214a. The air supplied to the air supply pipe 218 flows through the air channel 212, and is supplied to the channel 108 of the heat exchanger 14. A fuel gas supply pipe 100 and an exhaust gas pipe 106 are connected to the second case unit 214b.

In the third embodiment, a fuel is supplied from the fuel gas supply pipe 100 to the reformer 16. The reformer 16 reforms the fuel to produce a fuel gas. The fuel gas is supplied to the fuel gas supply passage 30 of the fuel cell stack 142. As shown in FIG. 16, the fuel gas flows through the fuel gas supply channel 66, and the fuel gas is supplied from the fuel gas inlets 54 to substantially the central region of the anodes 24 of the respective electrolyte electrode assemblies 26.

As shown in FIG. 13, the air is supplied from the air supply pipe 218 to the air channel 212. The air flows through the air channel 212 to the channel 108 of the heat exchanger 14. As described later, the exhaust gas is supplied to the channel 110 of the heat exchanger 14. The air heated by the exhaust gas is supplied to the oxygen-containing gas supply unit 67 provided in the outer region of the fuel cell stack 142.

As shown in FIG. 16, the air supplied to the oxygen-containing gas supply unit 67 flows through the oxygen-containing gas channel 50, and supplied from the oxygen-containing gas inlets 178 to substantially the central regions of the cathodes 22 of the electrolyte electrode assemblies 26. Thus, power generation is performed in each of the electrolyte electrode assemblies 26. The exhaust gas containing the fuel gas and the air after consumption in the reactions is discharged to the exhaust gas channel 68 formed around the respective electrolyte electrode assemblies 26.

The exhaust gas discharged to the exhaust gas channel 68 flows in the stacking direction. The exhaust gas flows through the holes 208a, 208b of the end plates 200a, 200b, and fills the chambers 206a, 207a in the first and second chamber units 206, 207. The exhaust gas temporarily in the chamber 206a is supplied to the channel 110. After heat exchange is performed in the heat exchanger 14, the exhaust gas is discharged into the exhaust gas pipe 106.

In the third embodiment, the exhaust gas discharged from the exhaust channel 68 temporarily fills the chamber 206a of the first chamber unit 206 formed at the end plate 200a. Therefore, the same advantages as in the case of the first and second embodiments can be achieved. For example, the temperature becomes uniform in the entire end plate 200a, and it is possible to reduce heat radiation from the end plate 200a.

Further, in the third embodiment, the end plate 200b and the inner wall plate 210 form the second chamber unit 207. The exhaust gas from the exhaust gas channel 68 flows through the holes 208b, and temporarily fills the chamber 207a of the second chamber unit 207. Therefore, the first and second chamber units 206, 207 are formed at opposite ends of the fuel cells 146 of the fuel cell stack 142 in the stacking direction. The hot exhaust gas fills each of the first and second chamber units 206, 207. Therefore, further improvement in the heat insulation performance is achieved.

The invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising:

a fuel cell stack including a plurality of fuel cells stacked together in a stacking direction and end plates provided at opposite ends of said fuel cells in the stacking direction, said fuel cells each including an electrolyte electrode assembly and separators sandwiching said electrolyte electrode assembly, said electrolyte electrode assembly including an anode, a cathode, and an electrolyte interposed between said anode and said cathode;

a heat exchanger for heating an oxygen-containing gas to be supplied to said fuel cell stack;

a reformer for reforming a fuel to produce a fuel gas;

a casing containing said fuel cell stack, said heat exchanger, and said reformer, wherein a chamber unit is formed at one of said end plates, and the oxygen-containing gas heated by said heat exchanger temporarily fills said chamber unit; and said heat exchanger and said reformer are directly connected to said chamber unit.

2. A fuel cell system according to claim 1, wherein said chamber unit has an opening for supplying the oxygen-containing gas temporarily in said chamber unit to said fuel cell stack.

3. A fuel cell system according to claim 1, wherein said heat exchanger and said reformer are provided on one side of said fuel cell stack.

4. A fuel cell system according to claim 3, wherein said reformer is provided inside said heat exchanger, and said heat exchanger and said reformer are provided symmetrically with respect to the central axis of said fuel cell stack.

5. A fuel cell system according to claim 4, wherein a fuel gas supply passage extends through the center of said fuel cell stack for supplying the fuel gas in the stacking direction;

an oxygen-containing gas supply unit for supplying the oxygen-containing gas heated by said heat exchanger in the stacking direction is formed around said fuel gas supply passage; and an exhaust gas channel for supplying an exhaust gas to said heat exchanger is formed in an outer region of said fuel cell stack.

6. A fuel cell system comprising:

a fuel cell stack including a plurality of fuel cells stacked together in a stacking direction and end plates provided at opposite ends of said fuel cells in the stacking direction, said fuel cells each including an electrolyte electrode assembly and separators sandwiching said electrolyte electrode assembly, said electrolyte electrode assembly including an anode, a cathode, and an electrolyte interposed between said anode and said cathode;

a heat exchanger for heating an oxygen-containing gas to be supplied to said fuel cell stack;

a reformer for reforming a fuel to produce a fuel gas;

a casing containing said fuel cell stack, said heat exchanger, and said reformer, wherein a chamber unit is formed at one of said end plates, and an exhaust gas discharged after consumption in reactions in said electrolyte electrode assembly temporarily fills said chamber unit; and said heat exchanger and said reformer are directly connected to said chamber unit.

7. A fuel cell system according to claim 6, wherein said chamber unit has an opening which is directly opened to said chamber unit for supplying the exhaust gas temporarily in said chamber unit to said heat exchanger.

8. A fuel cell system according to claim 6, wherein said heat exchanger and said reformer are provided on one side of said fuel cell stack.

9. A fuel cell system according to claim 8, wherein said reformer is provided inside said heat exchanger, and said heat exchanger and said reformer are provided symmetrically with respect to the central axis of said fuel cell stack.

10. A fuel cell system according to claim 9, wherein a fuel gas supply passage extends through the center of said fuel cell stack for supplying the fuel gas in the stacking direction;

an exhaust gas channel for supplying said exhaust gas to said heat exchanger is formed around said fuel gas supply passage; and an oxygen-containing gas supply unit for supplying the oxygen-containing gas heated by said heat exchanger is formed in an outer region of said fuel cell stack.

* * * * *